US006149798A

United States Patent [19] | [11] Patent Number: 6,149,798
Martin et al. | [45] Date of Patent: Nov. 21, 2000

[54] METHOD FOR MINIMIZING THE AERIAL OXIDATION OF PHOTOGRAPHIC DEVELOPERS

[75] Inventors: Didier J. Martin, Givry; Olivier J. Poncelet, Chalon sur Saone; Jean-Claude F. Boivin, Wattrelos; Gaetan J. Mairesse, Lambersart; Guy J. Nowogrocki, Lille, all of France

[73] Assignee: Eastman Kodak Company, Rochester, N.Y.

[21] Appl. No.: 09/192,253

[22] Filed: Nov. 13, 1998

[51] Int. Cl.[7] .......... B01D 53/00

[52] U.S. Cl. .......... 205/765; 205/634; 205/770

[58] Field of Search .......... 205/765, 634, 205/770

[56] References Cited

U.S. PATENT DOCUMENTS 5,007,992 4/1991 Weber .......... 205/765

*Primary Examiner*—Arun S. Phasge
*Attorney, Agent, or Firm*—J. Lanny Tucker

[57] ABSTRACT

The invention concerns a method for decreasing the oxygen content of the atmosphere above photographic processing baths. The method comprises using a solid electrolyte which is a compound of bismuth, vanadium or another transition metal. The oxidation in air is thus minimized and the life of the bath is extended.

13 Claims, 2 Drawing Sheets

METHOD FOR MINIMIZING THE AERIAL OXIDATION OF PHOTOGRAPHIC DEVELOPERS

FIELD OF THE INVENTION

The present invention concerns a method for improving the stability of photographic developers with respect to aerial oxidation.

BACKGROUND OF THE INVENTION

The efficacy of the development and of the developer depend on many factors, including the degree to which the developer has been used, or "seasoned". As it is used, the developer gains substances coming from the photographic film being processed, and is oxidized. Oxidation is the cumulative effect of the development (reduction of the silver halides) and contact with the air. The oxidation of the developer, that is, oxidation of the reducing substances which it contains, in particular the developing agents, impairs its efficacy and consequently requires the developer to be regenerated (or renewed) at regular intervals in order to maintain the sensitometric characteristics of the photographic films being processed and to prevent the formation of stain. In order to minimize the effects of aerial oxidation, which occurs even when the developer is not in use, large quantities of sulfite or bisulphite are usually incorporated in the developer (up to 100 g/l or more).

Even with sulfite added, developers suffer the effects of aerial oxidation. Also, this oxidation results in the transformation of the sulfite into sulphate, which must be then eliminated to allow recycling the developer, or discharging it to the drains.

The object of the present invention is a method of solving the aforementioned problem, that is, a method which makes it possible to minimize the aerial oxidation of a photographic developer by reducing the oxygen content in the vicinity of the free surface of the bath of photographic developer.

SUMMARY OF THE INVENTION

A method of treating a photographic bath comprising contacting the atmosphere in the vicinity of the free surface of the photographic bath with a cell comprising electrodes and a solid electrolyte, wherein the solid electrolyte is a substance that is conductive to $O^{2-}$ ions in the presence of an electric current and at a temperature, such that the electrodes and the electrolyte can dissociate the oxygen into $O^{2-}$ ions.

DETAILED DESCRIPTION OF THE INVENTION

This method, as shown by the following examples, makes it possible to obtain, in the vicinity of the surface of the bath, an atmosphere which is starved of oxygen, that is, an atmosphere containing less than 5% oxygen and advantageously less than 3% oxygen, instead of the normal oxygen content in atmospheric air, which is 21% (% by volume).

The term "vicinity" in the present specification, is intended to designate the atmosphere which may contribute to the aerial oxidation of the developer. It will be understood that the vicinity may depend on such parameters as the volume, the ventilation or the geometry of the room where the processing equipment is installed.

As mentioned above, the solid electrolyte is a substance which conducts $O^{2-}$ ions in the presence of an electric current. Substances of this type, associated with electrodes, can extract oxygen from air or from oxygen-containing gaseous mixtures. Such solid electrolytes are described in Abraham et al U.S. Pat. No. 5,227,257 as being derivatives of $Bi_4V_2O_{11}$ with a gamma phase in which at least one of the elements Bi or V is partially replaced by a substitution element so that the structure of the gamma phase and the equilibrium of the charges are maintained. These derivatives of $Bi_4V_2O_{11}$ therefore have in particular the following formula:

$$(Bi_{2-x}M_xO_2)(V_{1-y}M'_yO_z)$$

in which:

M represents one or more metals substituting Bi and having an oxidation number less than or equal to 3;

M' represents one or more elements substituting V and is selected from the class consisting of alkali metals, alkaline earth metals, the transition metals, metals of groups IIIa to Va or IIIb to Vb of the Periodic Table;

the limiting values of x, y and z are functions of the nature of M and M', and x plus y is greater than zero.

Metals can be transition metals such as Zn, Cu, Ni, Co, Fe, Mn, Cd, Sb, In, Al, Ti, Sn, Ru, Nb, Ta, Pb, Cr.

According to one embodiment, the compound has one of the formulae $Bi_2O_2(V_{1-y}M'_yO_z)$ or $(Bi_{2-x}M_xO_z)VO_z$. where M, M', x, y, z have the aforementioned meaning.

When x is not equal to 0, M preferably represents a rare earth.

When y is not equal to 0, M' preferably represents an alkali metal, an alkaline earth metal or a transition metal, such as Zn, Cu, Ni, Co, Fe, Mn, Cd, Sb, In, Al, Ti, Sn, Ru, Nb, Ta, Pb or Cr.

According to one embodiment, the solid electrolyte has the formula:

$$Bi_2V_{1-y}M'_yO_{5.5-1.5y}$$

where M' is a transition metal such as Cu, Zn or Co, and y is a number determined as a function of the metal and the degree of oxidation of the metals. Preferably, y is between 0.05 and 0.5 and advantageously between 0.08 and 0.25.

These substances are designated in the literature under the generic name Bimevox, or depending on the metal associated with bismuth, under the name Bicuvox, Bicovox, Biznvox, etc.

Figure 1:
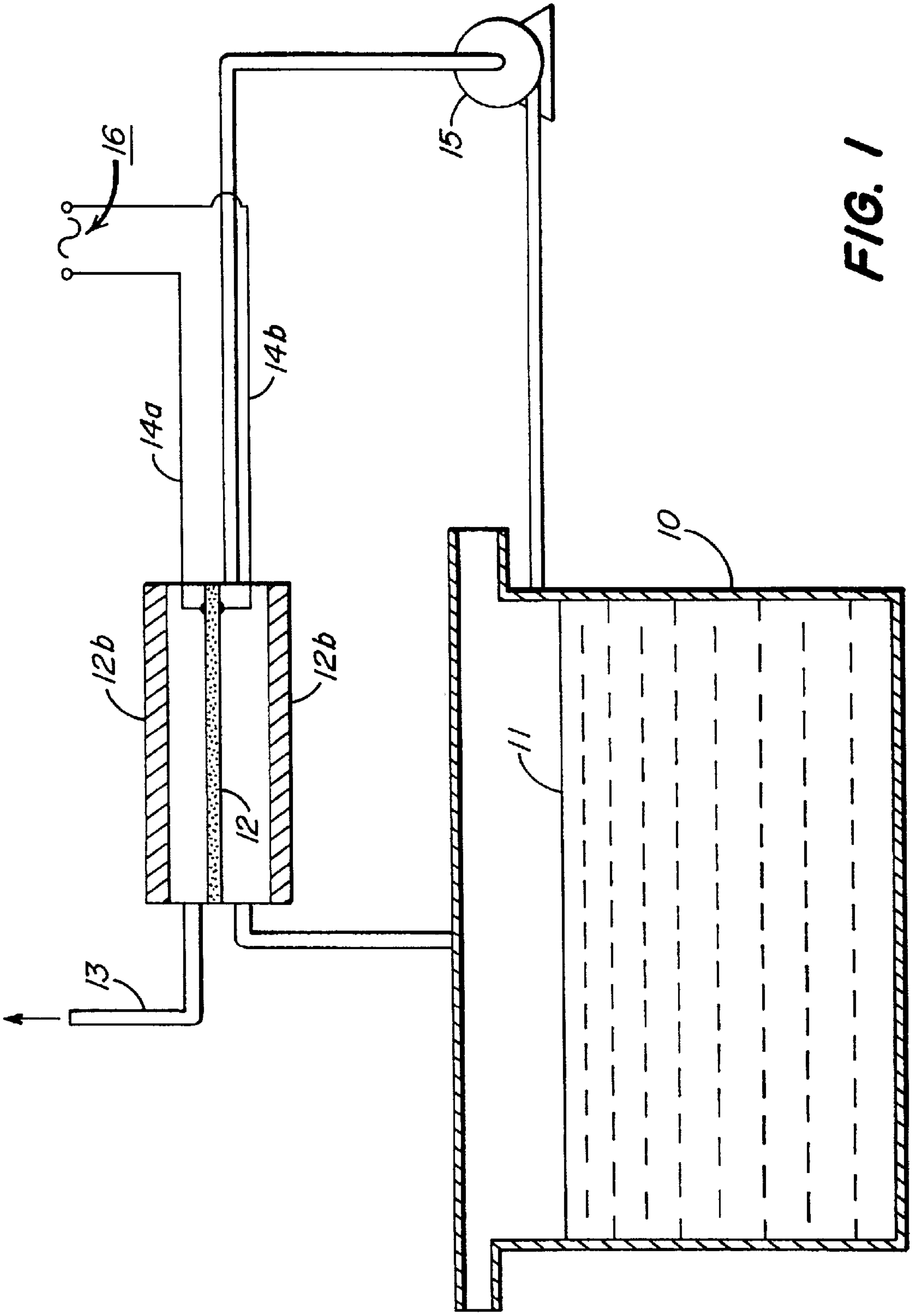
FIG. 1 depicts schematically a device for implementing the method of the invention.

The device comprises a tank 10 containing a photographic developer 11. The free surface of this developer is in contact with atmospheric air. A cell 12 comprising the solid electrolyte is placed in the vicinity of the free surface; each face of the cell 12 is connected to electrodes 14*a* and 14*b*, themselves connected to a current source (16); a pipe (13) and a pump (not shown) permits evacuation of the oxygen extracted from the atmospheric air by the solid electrolyte. The cell is placed in a heating source 12*b* in order it to operate at the desired temperature. A pump 15 circulates the air to be treated.

Figure 2:
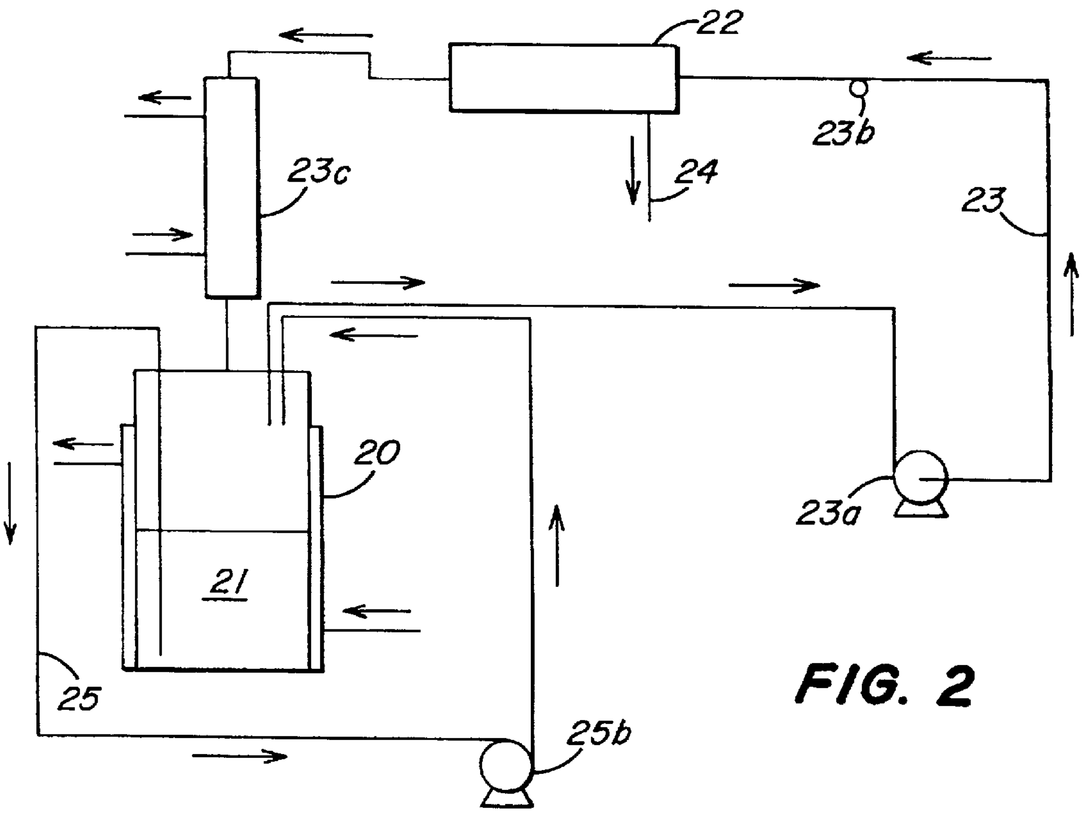

FIG. 2 depicts another embodiment of the invention, comprising a tank 20 containing a developer 21, a cell 22 containing Bimevox, a circuit 23 for pumping air above the surface of the developer, with a pump 23*a*, an oxygen gauge 23*b* and a condenser 23*c* for cooling the gaseous fluid after it has passed through the cell 22, a pipe 24 for evacuating oxygen and a circuit 25 for the developer with a pump 25*b*.

Figure 3:
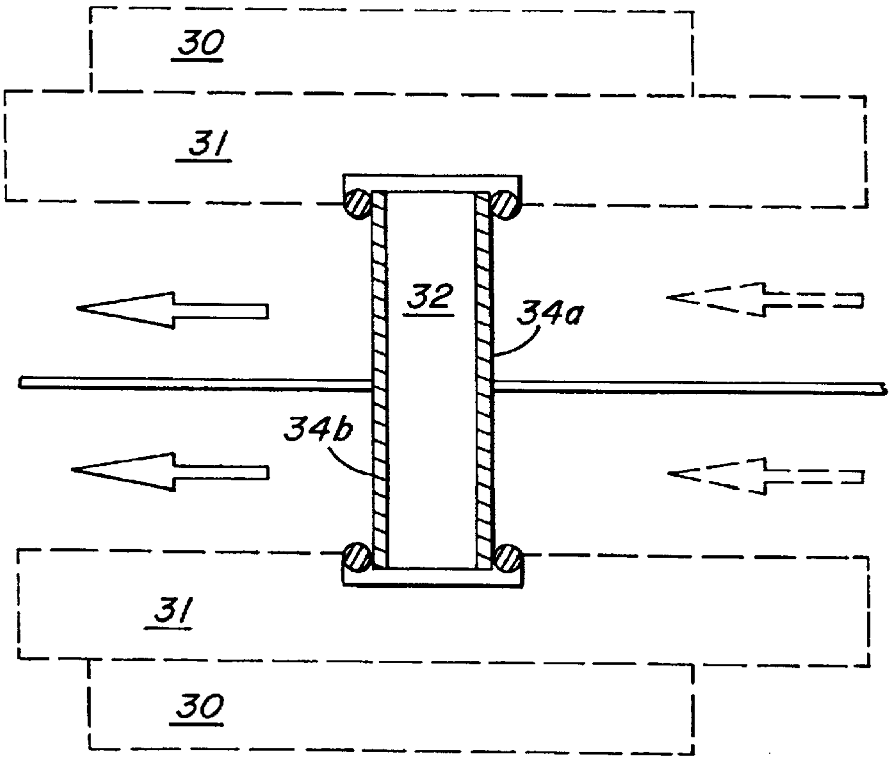

FIG. 3 depicts a cell such as 22 in FIG. 2, comprising a heating chamber 30 capable of producing temperatures of up to 700° C. or more, a ceramic or alumina wall 31, a slug 32 consisting of Bimevox, with electrodes 34*a* and 34*b* in the form of metallic grids set in the body of the slug but visible on each face of the slug.

The solid electrolyte exhibits $O^{2-}$ conductivity when its temperature is of at least 250° C., advantageously between 250 and 700° C. and more advantageously between 300 and 600° C., and when it has a voltage across it. A source producing a current density of 100 to 1500 mA/cm$^2$ at a voltage of 1 to 30 V and advantageously 2 to 15 V is used. Under these conditions, a solid electrolyte slug enables oxygen to be extracted from the atmospheric air above the surface of a developer, at a rate of between 100 and 1000 ml/hour with a slug with a surface area of approximately 2 cm$^2$. The oxygen content of the atmosphere in the vicinity of the free surface of the developer can thus be reduced by a factor of 10 until the initial content (21% by volume) is reduced to less than 2% by volume. The risk of aerial oxidation of the developer is therefore reduced accordingly. The cell containing the solid electrolyte is placed with respect to the surface of the bath so as to be able to reduce the oxygen content of the atmosphere likely to be in contact with this surface. The cell can be placed at a greater or lesser distance from the surface depending on whether a suction device is used which forces the ambient atmosphere to circulate throughout the cell. Because the operating temperature of the solid electrolyte is around 250 to 500° C., it is preferred that the cell not be contiguous to the surface of the bath.

According to another embodiment, the polarity of the electrodes of the device depicted in FIG. 1 is reversed so that, instead of reducing the oxygen content of the atmosphere, it is increased so as to oxidize the oxidizable substances contained in the photographic processing bath. It is possible, after a certain period of use, to destroy certain constituents of the bath before discharging it to the drains.

Preparation of the bimevox material

The procedure is in accordance with the operating method described in Abraham U.S. Pat. No. 5,227,257, that is by direct synthesis in solid phase, from $Bi_2O_3$ (99% Aldrich), $V_2O_5$ (99.6% Aldrich) and CuO (99% Aldrich), or another oxide such as CoO or ZnO, depending on circumstances. The constituents of this mixture are crushed in stoichiometric proportions. $Bi_2O_3$ is first heated to 600° C. for 6 hours until all traces of carbonate are eliminated. The crushed mixture is then heated for 12 hours at 700° C. and is left to cool at a rate of 20° C./hour. The structure and formula ($Bi_2V_{0.9}Cu_{0.1}O_{5.35}$) are checked by X-ray diffraction and pellets of this material are produced by compacting.

EXAMPLE 1A 600 ml of a color developing solution for Kodak Ektachrome E-6® processing was introduced into a closed tank. The developer was maintained at a temperature of 50° C. and stirred vigorously in order to simulate maximum aerial oxidation. By means of a loop and a pump, the conditions of circulation of the developer in the tank, at a rate of 50 ml/minute, were also reproduced. The volume of air in the tank above the surface of the developer was approximately 1000 ml.

In accordance with the arrangement in the diagram in FIG. 1, a cell comprising a solid electrolyte of formula $Bi_2V_{1-y}Cu_yO_{0.5-1.5y}$ with y=0.1 prepared in accordance with the operating method described above was placed above the surface of the developer.

The Bicuvox material was in the form of compacted cylindrical pellets, 16 mm in diameter and 5 mm thick, with two conductive metallic grids inserted in each pellet. The surfaces of the pellet were polished with an abrasive, so as to leave the mesh of the metallic grille showing on each face of the pellet, The assembly was placed in a refractory chamber provided with heating, and was connected to the electrical circuit (current source 16 in FIG. 1).

The cell was raised to a temperature of 500° C. and had a voltage (2 V, 200 mA) across it, enabling an oxygen concentration of approximately 2% to be attained. After 18 hours, the developing agent and sulfite contents of the developer were measured, and its coloration was examined.

The results are set out in Table I.

EXAMPLE 1B (comparative)

The operating method of Example 1A was repeated, except that a cell was not used and the developer was therefore in contact with atmospheric air.

After 18 hours, a strong brown coloring, and a very marked reduction in the concentration of developing agent and sulfite (see Table I) were noted.

TABLE I

| Example | Developing agent g/l | Sulfite g/l | Coloration |
|---|---|---|---|
| 1A | 5.06 (−4%) | 5.0 (−15%) | clear |
| 1B (comparative) | 1.94 (−70%) | 0.615 (−59%) | brown |

EXAMPLE 2A

The operating method of Example 1A was repeated, except that the E6 color developer was replaced with ascorbic acid black and white developer whose formula was as follows, and was given in Research Disclosure, August 1993, publication No 35249, page 543, "High Potassium Developing Solutions":

| | |
|---|---|
| $K_2CO_3$ | 100 g/l |
| $K_2SO_3$ | 50 g/l |
| Benzotriazole | 0.2 g/l |
| HMMP (1) | 2.5 g/l |
| KBr | 4 g/l |
| Ascorbic acid | 32 g/l |
| Anti-calcium agent (2) | 4.3 g/l |
| pH 10.2 at 20° C. | |

(1) 4-methyl-4-hydroxymethyl-1-phenyl-5-pyrazolidinone
(2) Diethylenetriaminopentacetic acid The results obtained are set out in Table II.

EXAMPLE 2B (comparative)

The operating method of Example 2A was repeated, except that the cell with solid electrolyte was omitted.

The results obtained are set out in Table II.

TABLE II

| Example | Developing agent g/l | Sulfite g/l | Coloration |
|---|---|---|---|
| 2A | 37.9 (−0%) | 8.9 (−4%) | clear |
| 2B (comparative) | 29.8 (−20%) | 6.0 (−25%) | brown |

It can be seen that the reference developer, in the absence of the cell, exhibits a significant reduction in the concentrations of developing agent and sulfite.

The invention has been described in detail with particular reference to certain preferred embodiments thereof, but it will be understood that variations and modifications can be effected within the spirit and scope of the invention.

What is claimed is:

1. A method of treating a photographic bath comprising contacting the atmosphere in the vicinity of the free surface of said photographic bath with a cell comprising electrodes and a solid electrolyte, wherein said solid electrolyte is a substance that is conductive to $O^{2-}$ ions in the presence of an electric current and at a temperature, such that said electrodes and said electrolyte can dissociate the oxygen into $O^{2-}$ ions.

2. The method of claim 1 wherein said solid electrolyte is a derivative of $Bi_4V_2O_{11}$ with a gamma phase in which at least one of the elements Bi or V is at least partly replaced by another element so that the structure of the gamma phase of $Bi_4V_2O_{11}$ is maintained as well as the equilibrium of the charges.

3. The method of claim 1 wherein said solid electrolyte has the formula $$(Bi_{2-x}M_xO_2)(V_{1-y}M'_yO_z)$$

wherein

M represents one or more metals which can be substituted for Bi and which have an oxidation number less than or equal to 3;

M' represents one of more elements which can be substituted for V and which is selected from the class consisting of alkali metals, alkaline earth metals, transition metals, metals of groups IIIa to Va and IIIb to Vb of the Periodic Table;

the limiting values of x, y and z being function of the substituting elements M and M', and x plus y is greater than zero.

4. The method of claim 1 wherein said solid electrolyte has the formula $$Bi_2V_{1-y}M'_yO_{5.5-1.5y}$$

where M' represents a transition metal and y is determined as a function of M' and the degree of oxidation of the metal.

5. The method of claim 4 wherein y is a number between 0.05 and 0.5.

6. The method of claim 4 wherein M' is copper, cobalt or zinc.

7. The method of claim 1 wherein said photographic bath is a developer.

8. The method of claim 7 wherein said photographic developer is a black and white developer comprising a developing agent of the ascorbic acid type.

9. The method of claim 7 wherein said photographic developer is a black and white developer comprising a developing agent of the hydroquinone type.

10. The method of claim 7 wherein said photographic developer is a color developer comprising a developing agent of the aromatic primary amine type.

11. The method of claim 7 wherein said photographic developer is a developer containing an inorganic developing agent.

12. The method of claim 1 wherein the atmosphere in the vicinity of the free surface of said photographic bath is contacted with said solid electrolyte at a temperature of between 250 and 700° C.

13. The method of claim 1 wherein a voltage of between 1 and 30 V and a current density of between 100 and 1500 $mA/cm^2$ are applied to said solid electrolyte.

* * * * *

UNITED STATES PATENT AND TRADEMARK OFFICE

CERTIFICATE OF CORRECTION

PATENT NO. : 6,149,798
DATED : November 21, 2000
INVENTOR(S) : Didier J. Martin, et al.

It is certified that error appears in the above-identified patent and that said Letters Patent is hereby corrected as shown below:

Title page,
Insert:
-- [30] Foreign Application Data
Nov. 14, 1997 [FR] France ...........9714531 --

Signed and Sealed this

Twenty-third Day of October, 2001

*Attest:*

Nicholas P. Godici

NICHOLAS P. GODICI

*Attesting Officer* *Acting Director of the United States Patent and Trademark Office*